(12) United States Patent
Nam

(10) Patent No.: US 8,235,694 B2
(45) Date of Patent: Aug. 7, 2012

(54) INJECTION MOLD FOR FORMING A LIGHT GUIDE PLATE

(75) Inventor: Ji Geun Nam, Seoul (KR)

(73) Assignee: LG Display Co., Ltd., Seoul (KR)

( * ) Notice: Subject to any disclaimer, the term of this patent is extended or adjusted under 35 U.S.C. 154(b) by 845 days.

(21) Appl. No.: 12/285,864

(22) Filed: Oct. 15, 2008

(65) Prior Publication Data

US 2009/0273731 A1 Nov. 5, 2009

(30) Foreign Application Priority Data

Apr. 30, 2008 (KR) ........................ 10-2008-0040575

(51) Int. Cl.
*B29C 45/73* (2006.01)

(52) U.S. Cl. ...................... 425/174.4; 425/547; 425/552

(58) Field of Classification Search .................. 264/1.31, 264/2.5; 425/174.4, 406, 547, 552
See application file for complete search history.

(56) References Cited

U.S. PATENT DOCUMENTS

2004/0178524 A1* 9/2004 Lee et al. ...................... 264/1.31

OTHER PUBLICATIONS

Donald V. Rosato and Dominick V. Rosato, Injection Molding Handbook, 1995, pp. 257-261.*

* cited by examiner

*Primary Examiner* — Timothy Heitbrink
(74) *Attorney, Agent, or Firm* — Birch, Stewart, Kolasch & Birch, LLP

(57) ABSTRACT

An injection mold for forming a light guide plate including a first block, a second block configured to face the first block, a forming portion included between the first and second blocks facing each other and having a shape of the light guide plate, an injection portion formed at the first block and configured to receive injected resin for forming the light guide plate, and a gate portion configured to guide the injected resin from the injection portion to the forming portion. Further, a width of a first end portion of the gate portion that is connected to the forming portion is 50%-80% of a width of the forming portion.

9 Claims, 13 Drawing Sheets

(6 of 13 Drawing Sheet(s) Filed in Color)

RIPPLE PHENOMENON

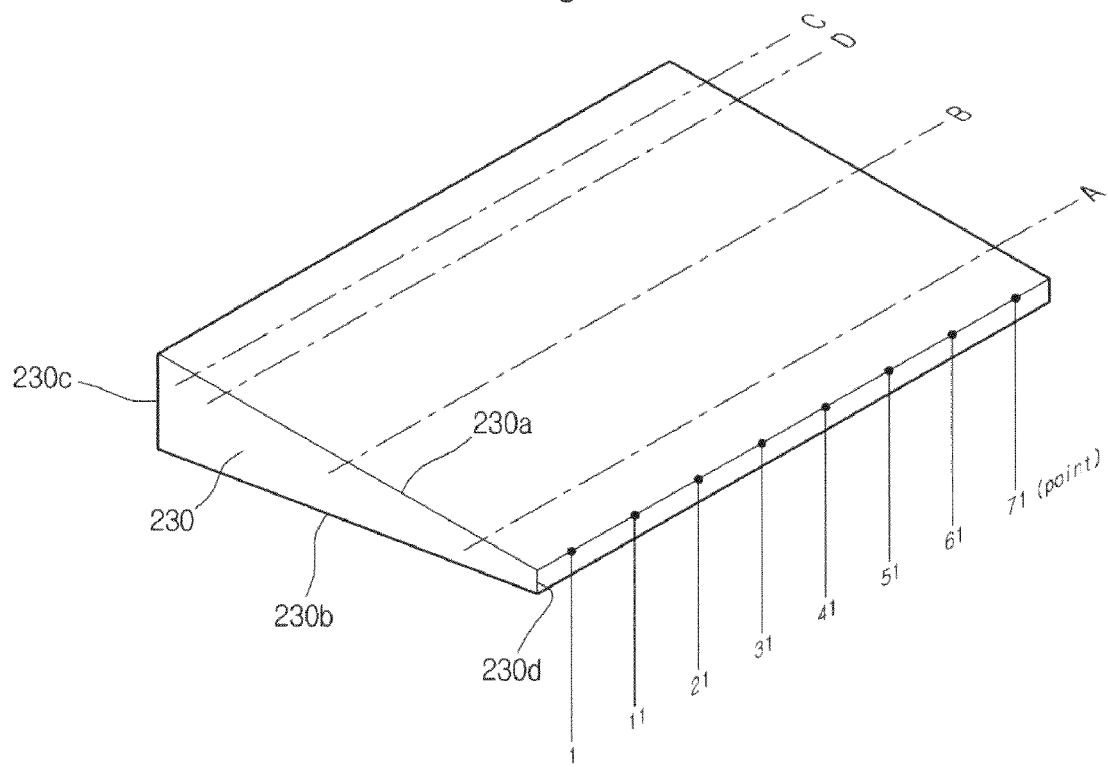

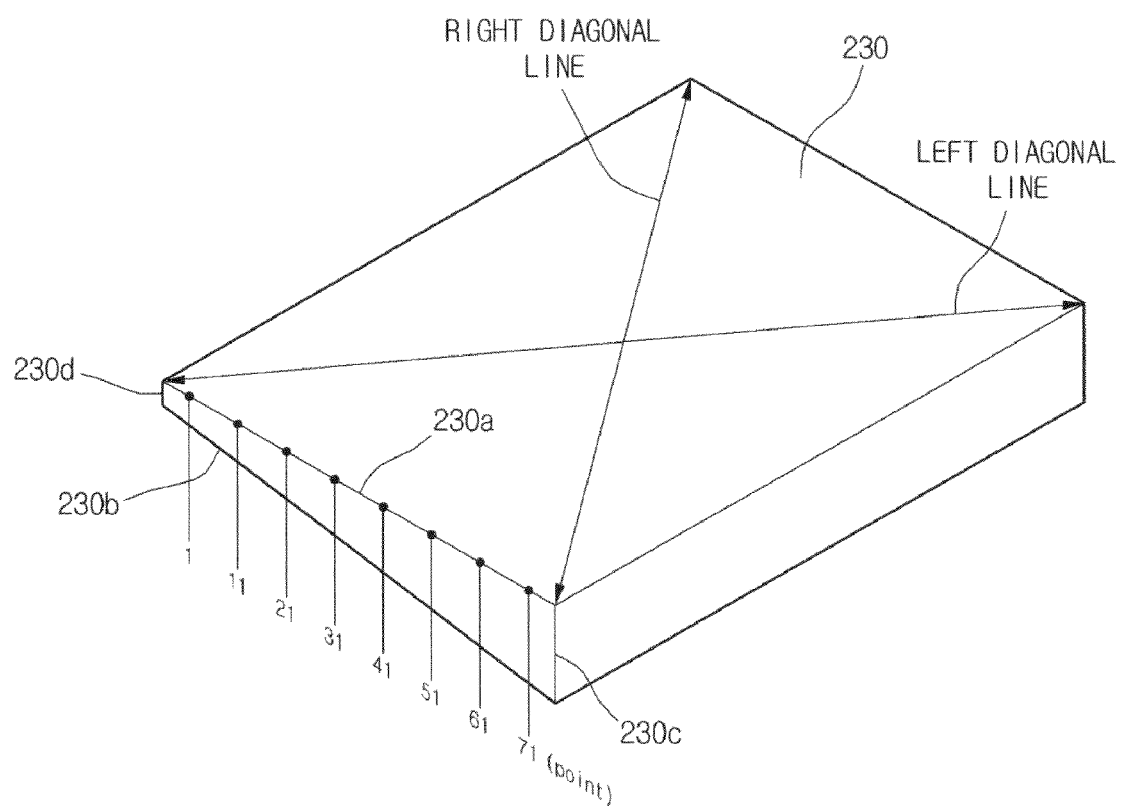

INJECTION MOLD FOR FORMING A LIGHT GUIDE PLATE

CROSS-REFERENCE TO A RELATED APPLICATION

This application claims priority under 35 U.S.C. 119 to Korean Patent Application No. 10-2007-0040575, filed in Korea on Apr. 30, 2008, which is hereby incorporated by reference in its entirety.

BACKGROUND OF THE INVENTION

1. Field of the Invention

The present application relates to an injection mold that minimizes a residual stress of a molded light guide plate, a light guide plate fabricated using the same, and a Liquid Crystal Device (LCD) device having the light guide plate.

2. Description of the Related Art

An LCD is advantageous over a Cathode Ray Tube (CRT), because an LCD can be made to have a small size, is lightweight and provides a better overall picture quality. Thus, LCDs are now used in many devices such as televisions, computers, etc. Further, because the LCD is a non-luminous type device, the LCD includes a backlight unit that applies a light to the rear of the LCD panel.

In addition, the backlight unit consumes 70% or more of the driving power used in the LCD device, and therefore affects the size, the light efficiency, mechanical and optical characteristics, etc. of the LCD. Also, the backlight unit can be classified into a direct type and an edge type based on the location of the light source that supplies light.

In more detail, when the brightness of the screen is not higher than 300 nits and the LCD must have a thin-shape such as for monitors or notebooks, the edge type backlight unit is used. The direct backlight unit is used for devices such as televisions, etc. Further, the edge type backlight unit includes a light source for generating light, and a light guide portion which converts the light generated at the light source into a uniform planar light. The light guide portion includes a light guide plate guiding the light across the surface of the LCD. That is, the light guide plate makes the light generated at the light source uniformly progress to all areas of the LCD panel.

However, because the edge type backlight unit has one or two light sources located at a side surface or two opposed side surfaces of the light guide plate, a brightness difference is generated between a region of the light guide plate close to and another region of the light guide plate remote from the light source. Therefore, the light guide plate has a pattern which disperses and scatteredly reflects the light incident into the light guide plate and transfers the dispersed and reflected lights toward the LCD panel. That is, the related art light guide plate does not uniformly distribute the light to the LCD panel.

In more detail, FIG. 1 is a cross-sectional view of a related art LCD device 10. As shown, the related art LCD device 10 includes an LCD panel 18 for displaying images, a backlight unit for applying light to the LCD panel 18, and a top case 60 covering the side of the LCD panel 18. In addition, the LCD panel 18 includes an array substrate 14 and a color filter substrate 16, which are bonded together with a fixed distance therebetween.

The array substrate 14 includes a plurality of pixels formed in a matrix shape, and the color filter substrate 16 includes at least three color filters formed in a matrix shape (e.g., R, G and B). Further, the backlight unit is located at the rear of the LCD panel 18 and applies light to the LCD panel 18. As shown in FIG. 1, the backlight unit includes a lamp 40, a light guide plate 30 disposed at one side of the lamp 40, and optical members 20 disposed over the light guide plate 30. The optical members 20 in FIG. 1 include a diffusion plate 21, a prism sheet 22 and a protection sheet 23.

In addition, the backlight unit is placed in and fixed to a bottom case 50. The bottom and top cases 50 and 60 are combined together to form a single unit. Further, the light guide plate is mainly fabricated using an injection molding process. However, the related art injection molding process for the light guide plate 30 has a problem in that residual stresses, such as a stress caused by a resin-filling unbalance and the stress generated by areas of the plate 30 cooling at different rates exist within the molded light guide plate 30.

Further, these residual stresses cause the light guide plate 30 to be deformed over time because of the high temperature they operate in. The deformed light guide plate 30 then presses neighboring elements contained within the LCD. For example, as shown in FIG. 1, the deformed light guide plate 30 presses the LCD panel 18 at the position "B", which changes the liquid crystal alignment angle within the LCD panel 18. The changed liquid crystal alignment causes a picture quality defect such as a ripple phenomenon. The deformed light guide plate 30 also presses the bottom case 50 at the position "A" in FIG. 1, which negatively affects the optical pattern of the light guide plate 30, thereby causing a white spot defect.

For example, FIG. 2 is a photograph showing an example of a defect that appears on the screen of the LCD and that is caused by the light guide plate 30 bending. As shown in FIG. 2, a protruded or bent portion of the light guide plate 30 presses the optical members 20 and the LCD panel 18, thereby causing a ripple phenomenon effect on a screen 15 of the LCD 10. The lifetime of the light guide plate is also reduced.

SUMMARY OF THE INVENTION

Accordingly, one object of the present embodiments is to provide an injection mold that substantially obviates one or more of problems due to the limitations and disadvantages of the related art.

Another object of the present embodiment is to provide an injection mold that minimizes the residual stress of a molded article by modifying a shape of a gate portion guiding resin from an injection portion, so as to prevent the deformation of the molded article.

Yet another object of the present embodiment is to provide a light guide plate and corresponding LCD using the injection mold having the modified shape of the gate portion to minimize its residual stress, thereby improving the uniformity of an optical pattern.

To achieve these and other advantages and in accordance with the purpose of the present invention, as embodied and broadly described herein, the present invention provides in one aspect an injection mold for forming a light guide plate including a first block, a second block configured to face the first block, a forming portion included between the first and second blocks facing each other and having a shape of the light guide plate, an injection portion formed at the first block and configured to receive injected resin for forming the light guide plate, and a gate portion configured to guide the injected resin from the injection portion to the forming portion. Further, a width of a first end portion of the gate portion that is connected to the forming portion is 50%-80% of a width of the forming portion.

In another aspect, the present invention provides a method of forming a light guide plate, and which includes preparing a mold including an injection portion configured to receive injected resin for forming the light guide plate, a forming portion having a shape of the light guide plate, and a gate portion configured to guide the injected resin from the injection portion to the forming portion. Further, a width of a first end portion of the gate portion that is connected to the forming portion is 50%-80% of a width of the forming portion. The method also includes injecting the resin into the injection portion such that the injected resin is guided by the gate portion into the forming portion, cooling the injected resin to form a molded light guide plate, removing the molded light guide plate from the mold, and cutting away the gate portion of the molded light guide plate.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The accompanying drawings, which are included to provide a further understanding of the embodiments and are incorporated in and constitute a portion of this application, illustrate embodiment(s) of the invention and together with the description serve to explain the disclosure. In the drawings:

FIG. 10A is a perspective view illustrating a measuring standard of the light guide plate according to an embodiment of the present invention;

FIG. 12 is a perspective view illustrating a measuring standard of the light guide plate for twist characteristics of the light guide plate according to an embodiment of the present invention;

DETAILED DESCRIPTION OF THE INVENTION

Reference will now be made in detail to the embodiments of the present disclosure, examples of which are illustrated in the accompanying drawings. Wherever possible, the same reference numbers will be used throughout this disclosure including the drawings to refer to the same or like portions.

The inventor of the present invention advantageously determined that one of the causes that generate the bending of the light guide plate 30 is that the gate structure of the mold through which resin is injected upon injection molding is narrow and thick. Therefore, when resin is injected into the light guide plate mold, a portion of the cavity remote from the gate is not sufficiently filled with the resin as the resin is filled into a wide cavity from the narrow gate. As a result, the brightness provided by the molded light guide plate is decreased at a portion of the light guide plate which is not properly formed, thereby causing the brightness uniformity of the entire LCD panel to be deteriorated.

Furthermore, the inventor also determined that when injection molding is performed using a resin under a process condition of a high pressure and rapid filling speed, the pressure applied to the resin when forming the product is increased. Accordingly, much of the residual stress is left in the molded light guide plate. The residual stress causes the light guide plate to be bent, thereby causing a screen display defect of the LCD panel.

Figure 3:
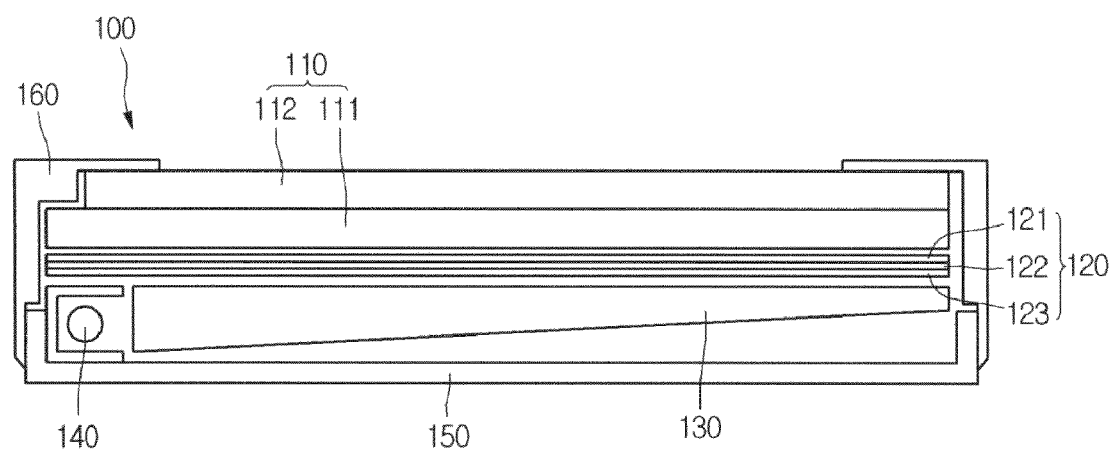
FIG. 3 is a cross-sectional view illustrating an LCD device including a light guide plate according to an embodiment of the present invention.

FIG. 3 is a cross-sectional view illustrating an LCD device 100 including a light guide plate according to an embodiment of the present invention. As shown, the LCD device 100 includes an LCD panel 110 for displaying images, a backlight unit for applying light to the LCD panel 110, and a top case 160 covering the side of the LCD panel 110. Further, the LCD panel 110 includes an array substrate 111 and a color filter substrate 112 that are bonded together with a fixed distance therebetween. The array substrate 111 includes a plurality of pixels formed in a matrix shape, and the color filter substrate 112 includes at least three color filters formed in a matrix shape.

Also, the LCD panel 110 includes a liquid crystal layer interposed between the substrates 111 and 112. A gate printed circuit board is also connected to a gate pad portion of the LCD panel 110 and applies drive signals to the gate pad portion. The gate printed circuit board can be adhered to one side of the LCD panel 110 in a TCP (tape carrier package) system. Further, a data printed circuit board is connected to a data pad portion of the LCD panel 110 and applies data signals to the data pad portion. The data printed circuit board can be adhered to the other side of the LCD panel 110 in the TCP system.

Figure 1:
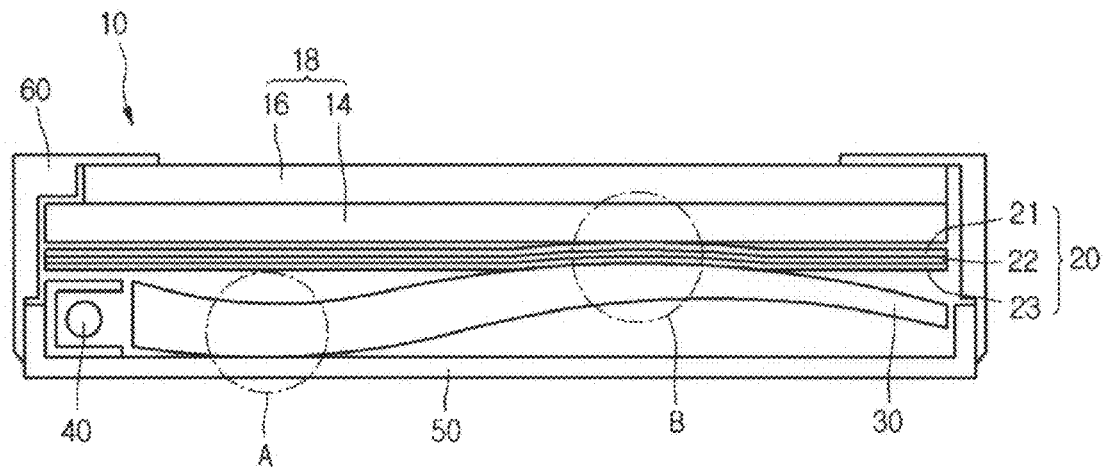
FIG. 1 is a cross-sectional view illustrating a related art LCD device.
Figure 2:
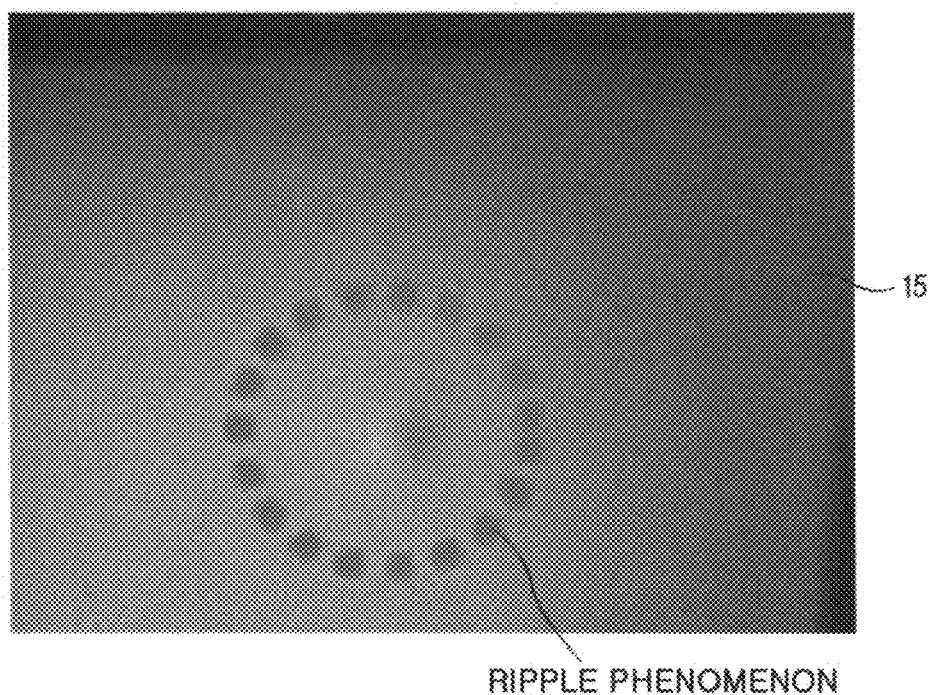
FIG. 2 is a photograph showing an example of a ripple defect caused by a related art edge type backlight unit.

In addition, as shown in FIG. 1, the backlight unit is located at the rear of the LCD panel 110 and applies light to the LCD panel 110. Further, the backlight unit includes a lamp 140, a light guide plate 130 disposed at one side of the lamp 140 to make the incident light from the lamp 140 progress toward the LCD panel, and optical members 120 disposed on the light guide plate 130. The optical members 120 cover the lamp 140 from being seen by users, and makes the light uniformly incident to the LCD panel 110. As shown, the optical members 120 include at least one of a diffusion plate 121, a prism sheet 122 and a protection sheet 123.

In addition, as shown in FIG. 1, the backlight unit is placed in and fixed to a bottom case 150. The bottom case 150 includes a bottom surface and side walls extended from the bottom surface to house the backlight unit. That is, the bottom case 150 has a rectangular shape with one side opened. Further, a material of the bottom case 150 can be aluminum and preferably has a high thermal conductivity and light weight.

In addition, the top case 160 is located on the LCD panel 110 and the bottom case 150 is located at the lower portion of the backlight unit. The top case 160 and the bottom case 150 are also combined so as to fix and protect the LCD panel 110 and the backlight unit. Further, the light guide plate 130 is fabricated through a process of using an injection mold to minimize its residual stresses and bending. Thus, the light guide plate 130 according to embodiments of the present invention does not cause picture quality defects such as a white spot phenomenon and ripple phenomenon on the screen of the LCD panel 110, because pressure is not applied to the LCD panel 110 or to the bottom case 150. The fabricating process of the light guide plate 130 will now be described with reference to FIGS. 4 to 8.

Figure 4:
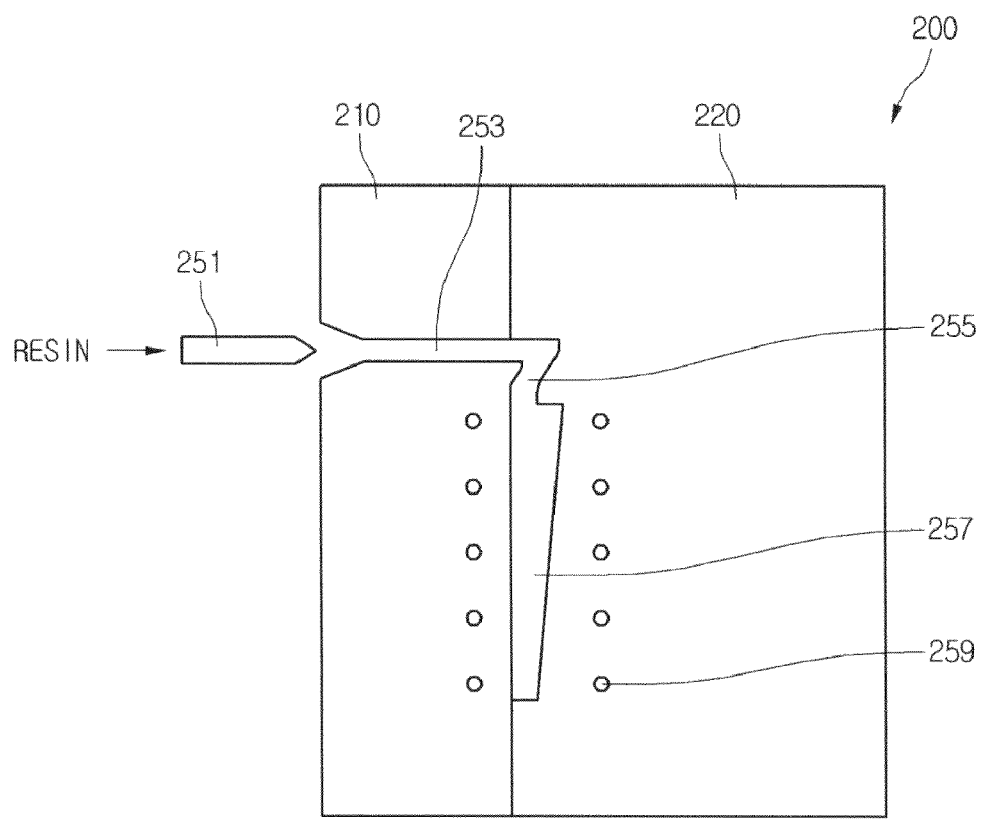
FIG. 4 is a cross-sectional view illustrating an injection mold according to an embodiment of the present invention.
Figure 5:
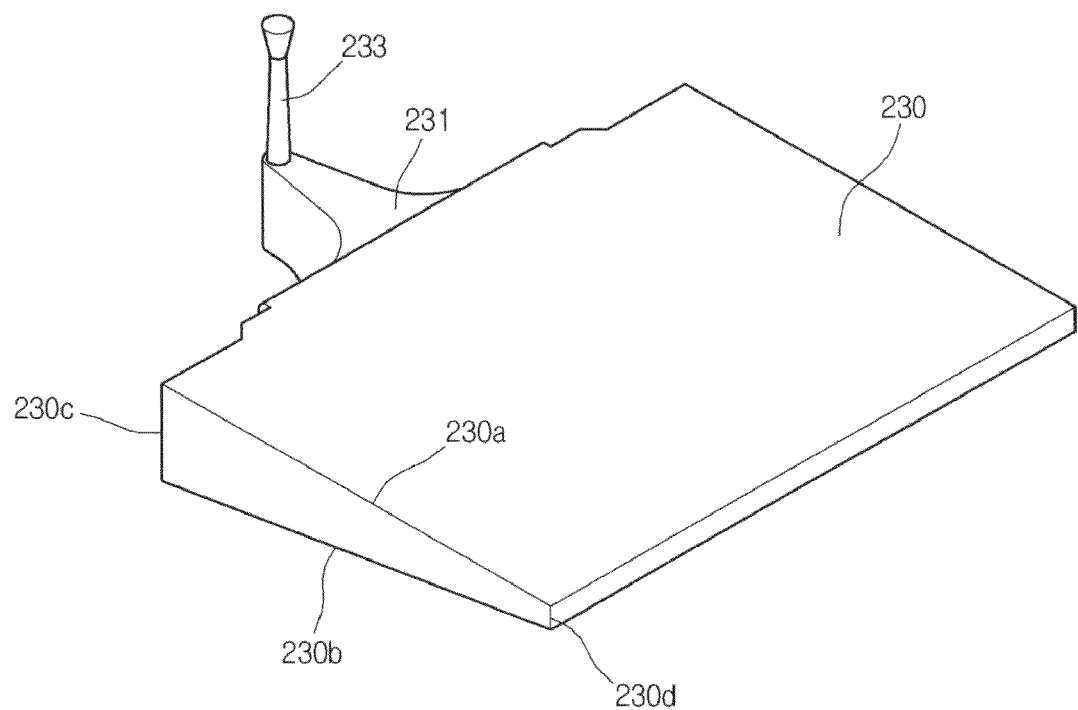
FIG. 5 is a perspective view illustrating the light guide plate fabricated using the injection mold of FIG. 4.

In more detail, FIG. 4 is a cross-sectional view illustrating an injection mold 200 according to an embodiment of the present disclosure, and FIG. 5 is a perspective view illustrating a light guide plate fabricated using the injection mold of FIG. 4. As shown in FIG. 4, the injection mold 200 includes an injection portion 253 receiving a molten resin from a nozzle 251, a first block 210 provided with the injection portion 253, a second block 220 facing the first block 210, a forming portion 257 inclusive of cavities corresponding to the shape of a molded product to be fabricated between the first block 210 and the second block 220, and a gate portion 255 transferring the molten resin from the injection portion 253 to the forming portion 257.

Further, in one embodiment of the present invention, the first block 210 of the mold 200 is fixed, and the second block 220 is combined with the first block 210 in such a manner to face the first block 210, thereby providing the forming portion 257. Also, when the molded product is completed, the second block 220 is separated from the first block 210 to take the molded product out. In addition, as shown in FIG. 4, the injection molding 200 also includes cooling channels 259 provided within the first block 210 and the second block 220. The cooling channels 259 allow the molten resin to be cooled and hardened at the forming portion 257.

In addition, the forming portion 257 can have various shapes in accordance with the shape of the molded product. Also, the forming portion 257 has a surface tilted with respective to the other surface and a width of the upper portion is different from a width of the lower portion thereof. Further, a plurality of groove patterns or other patterns can be formed in one surface of the forming portion 257. For example, a surface of the forming portion 257 can be a prism pattern to emit light to a front side of the plate when input from the side of the plate. Further, a surface of the forming portion 257 that is a light side surface can have a less dense pattern than a non-light side surface so light is uniformly emitted. A prism pattern can also be formed on both surfaces to improve a gray scale characteristic. Other types of patterns include a sanding pattern used to uniformly emit light or a lens-shaped pattern. The resin injected into the mold 200 can be different in accordance with the material of the molded product, and in one embodiment is thermoplastic resin.

In more detail, in one embodiment, transparent liquid PMMA (polymethyl Methacrylate) resin is used as the material of the light guide plate, but other materials can be used as the material of the light guide plate. Further, as shown in FIG. 5, the molded product is injection-molded in the forming portion 257 together with a gate 231 and a projected portion 233 corresponding to the shape of the gate portion 255 and the injection portion 253 in the light guide plate 230.

Also, the light guide plate 230 includes a first flat surface 230*a*, a second surface 230*b* tilted to the first surface 230*a*, a third surface 230*c* that is a side of the thickest portion thereof, and a fourth surface 230*d* having the thinnest portion. As shown in FIG. 5, the first and second surfaces face each other, and the third and fourth surfaces face each other. Also, the third surface 230*c* can be a light incidence surface and the first surface 230*a* can be a light output surface.

Further, the third surface 230*c* of the light guide plate 230, which is injection-molded, is connected to the gate 231, and the gate 231 is connected to the projected portion 233 before being processed. In addition, the gate 231 and the protruded portion 233 are incidentally formed at the light guide plate 230 because of the shape of the mold 200, and are cut and removed after the injection molding process. The cut portion is marked as a dotted line 245 in FIG. 6.

Figure 6:
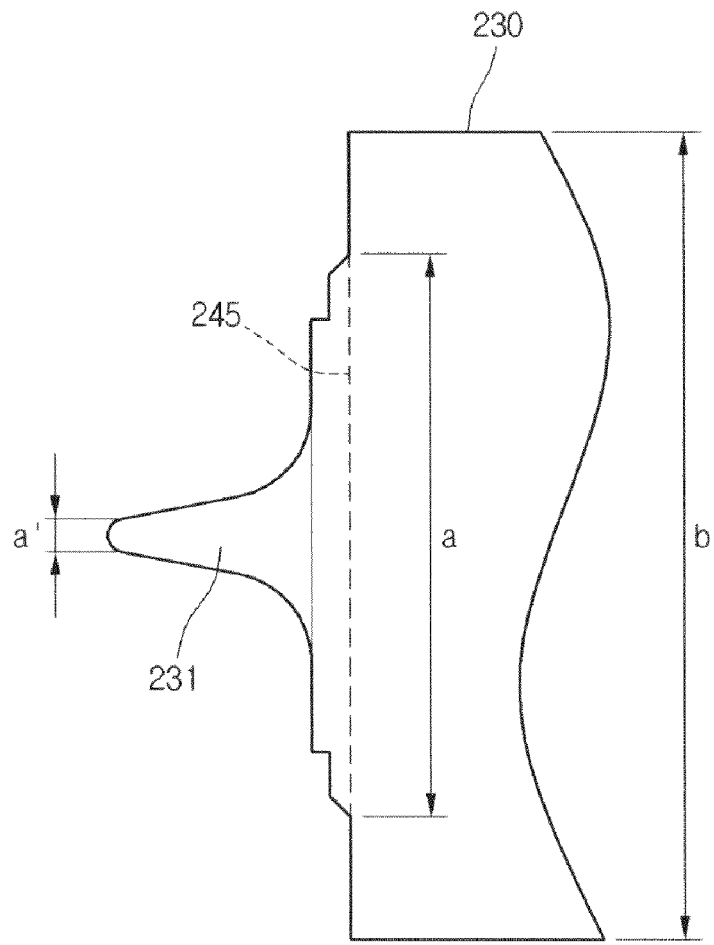
FIG. 6 is a front view illustrating a portion of the light guide plate fabricated using the injection mold of FIG. 4.

Also, as shown in FIGS. 5 and 6, the upper portion of the gate 231 has a narrow width, and the lower portion of the gate 231 connected to the third surface 230*c* of the light guide plate 230 has a broad width. The gate 231 is also formed in a manner that its side is curved or stepped from the upper portion to the lower portion. In more detail, FIG. 6 is a front view illustrating a port of the light guide plate and the gate 231 which are injection-molded using the mold of FIG. 4, and FIG. 7 is a side view of the part of the light guide plate and the gate in FIG. 6.

As shown in FIG. 6, the width (a) of the lower portion of the gate 231 fabricated by the injection mold according to an embodiment is 50%-80% of the width (b) of the upper portion of the light guide plate 230. Further, the width (a') of the upper portion of the gate 231 is preferably around 15 mm-25 mm. The width (a') of the upper portion of the gate 231 corresponds to the minimum width of the gate, and the width (a) of the lower portion of the gate 231 corresponds to the maximum width of the gate 231.

Figure 7:
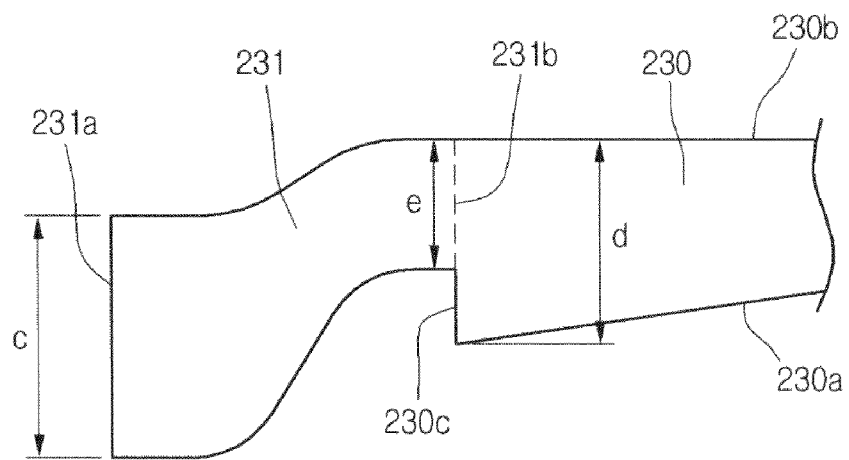
FIG. 7 is a side view illustrating the portion of the light guide plate of FIG. 6.

Furthermore, as shown in FIG. 7, the width (c) of the upper portion 231*a* is preferably 1.3 to 1.5 times the maximum thickness (d) of the light guide plate 230, i.e., the thickness of the third surface 230*c*. The thickness (e) of the lower portion 231*b* of the gate 231 is preferably equal to or thinner than the maximum thickness (d) of the light guide plate 230.

Figure 8:
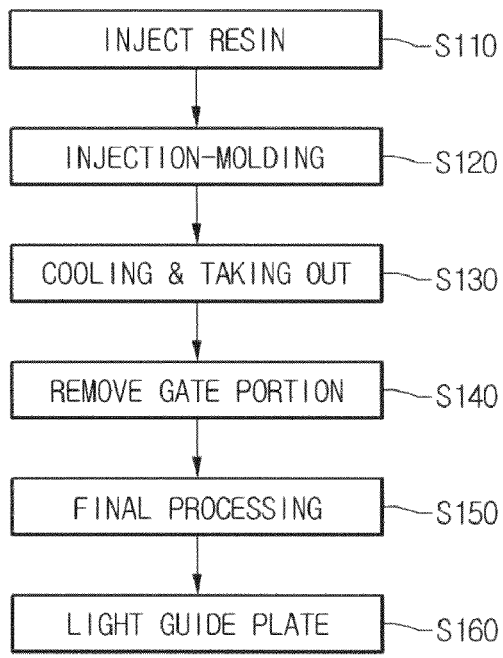
FIG. 8 is a flowchart illustrating a method of fabricating a light guide plate using an injection mold according to an embodiment of the present invention.

Next, FIG. 8 is a flowchart illustrating a method of fabricating the light guide plate using the injection mold according to an embodiment of the present invention. FIGS. 4-7 will also be referred to in this description. As shown in these figures, the first block 210 and the second block 220 of the mold 200 face each other and are combined, thereby forming the forming portion 257. Then, as shown in FIG. 8, resin is injected into the injection portion 253 of the injection mold 200 (S110).

For example, the injected resin can be a transparent liquid PMMA (Polymethyl Methacrylate) resin so as to form the light guide plate 230. Alternatively, the resin can be a thermoplastic resin. In addition, the resin injected to the injection portion 253 is filled into the cavity within the forming portion 257 through the gate portion 255 to be injection-molded (S120).

In addition, and as discussed above, the width of the lower portion of the gate portion 255 is wider than that of the related art and is 50%-80% of the width of the upper portion of the forming portion 257. Further, the thickness of the upper portion of the gate portion 255 is about 1.3-1.5 times thicker than the upper portion of the forming portion 257. Thus, because the injection hole of the gate portion is broadened, the pressure of the resin injected into the forming portion 257 from the gate portion 255 is decreased when compared with the related art. Thus it is possible to reduce the residual stress of the molded product.

Further, the resin is injected into the forming portion 257 at a low pressure, and thus the resin is scrupulously filled to the end of the forming portion 257. Therefore, the quality of forming the light guide plate 230 is improved and a minute or fine pattern formed in the light guide plate 230 can be injection-molded to have an excellent quality, and it is possible to improve the uniformity of brightness of the entire light guide plate 230.

Next, as shown in FIG. 8, the liquid resin filled into the cavities of the forming portion 257 is cooled down so as to be hardened, and the second block 220 is separated from the first block 210 such that the molded product can be taken out from the forming portion 257 (S130). Then, the gate 231 is cut from the light guide plate 230 and removed from the molded product (S140).

The cut surface of the light guide plate 230 is then processed and finished (S150), thereby completing the light guide plate 230 (S160). Further, although the cut surface cannot be visually seen when the light guide plate 230 is finally processed, the location of the cut surface can be presumed by the characteristics of the rolling of the light guide plate 230.

Figure 9A:
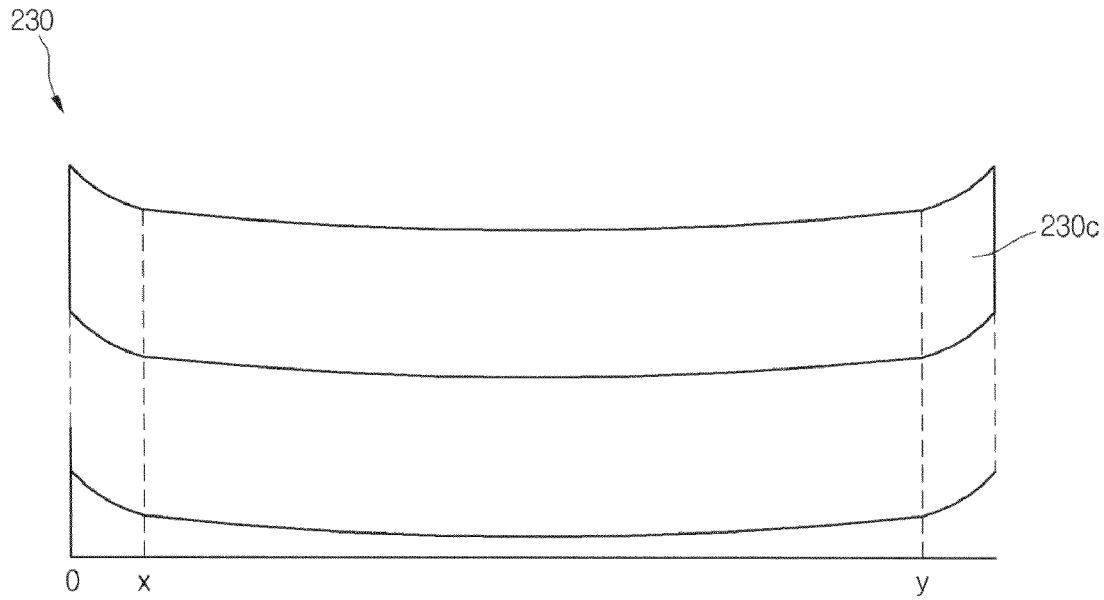
FIGS. 9A and 9B are overviews illustrating the side of a light guide plate fabricated by cutting the gate according to an embodiment of the present invention.
Figure 9B:
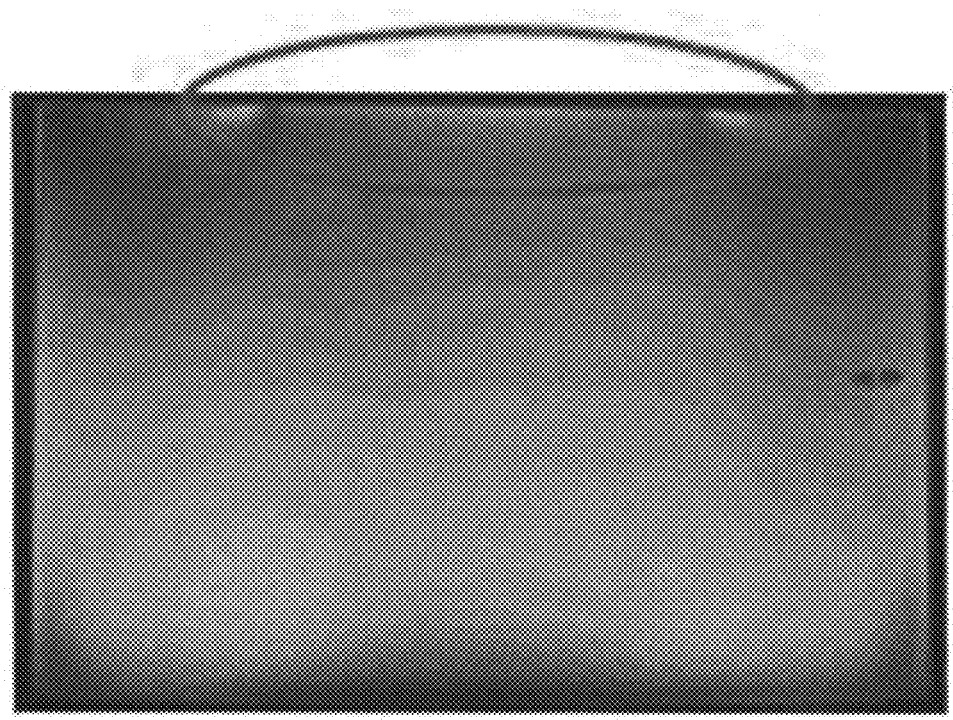
Figure 9C:
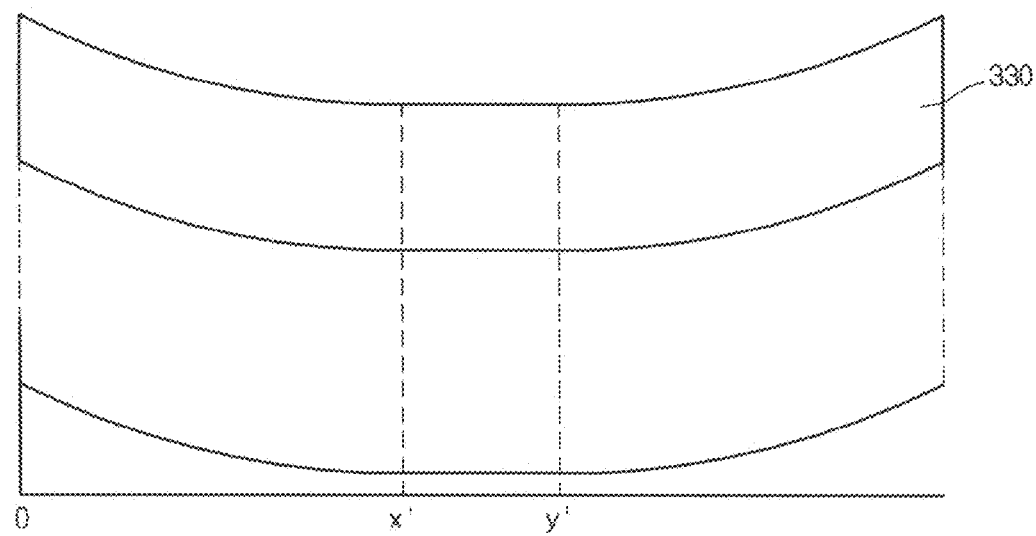
FIGS. 9C and 9D are overviews illustrating the side of the related art light guide plate fabricated by cutting the gate.
Figure 9D:
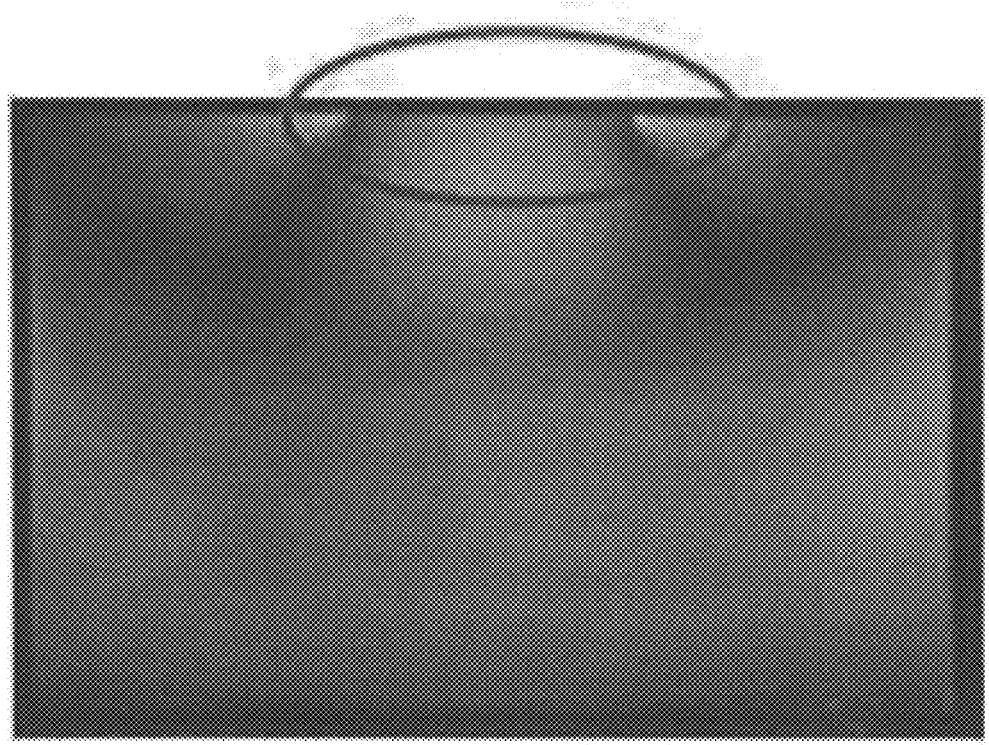

Next, FIGS. 9A and 9B are overviews illustrating a side of the light guide plate fabricated by cutting the gate according to an embodiment of the present invention, and FIGS. 9C and 9D are overviews illustrating a side of the light guide plate fabricated by cutting the gate according to the related art. Referring to FIG. 9A, the third surface 230c of the light guide plate 230 fabricated according to an embodiment of the present invention is rolled at both ends in one direction. Further, if the height of the corner of the third surface 230c is measured, an inflection point (x, y) is generated at the beginning portion and the end portion of the cut surface.

In addition, the distance between both inflection points of the side of the light guide plate 230 according to the present embodiment almost coincides with the width (a) of the lower portion of the gate 231. For example, when the width of the light guide plate 230 is 350 mm and the width of the lower portion of the gate 231 is 260 mm, the distance between both the inflection points (x, y) is around 260 mm without taking error into consideration.

In addition, as shown in FIG. 9C, if the height of the side corner of the related art light guide plate 330 is measured, an inflection point (x', y') is generated at the beginning portion and end portion of the cut surface and the distance between the inflection points (x, y) is relatively short compared to the embodiment of the present invention (see the comparison between FIGS. 9C and 9D). For example, when the width of the related art light guide plate 330 is 350 mm and the width of the lower portion of the related art gate 231 is 70 mm, the distance between both the inflection points is around 70 mm without taking error into consideration.

Further, as discussed above, the cut surface can be assumed due to the characteristics of the light guide plate. Accordingly, the width of the gate of the light guide plate can be estimated by measuring the inflection point of the side of the light guide plates 230, 330. In addition, various characteristics of the light guide plate which allow presumption of the cut surface include a characteristic that both ends of the light guide plate are rolled up in a curve shape by little residual stress, and another characteristic that the cut surface and the un-cut surface of the side of the light guide plate have a difference in chemical and mechanical properties.

Figure 10B:
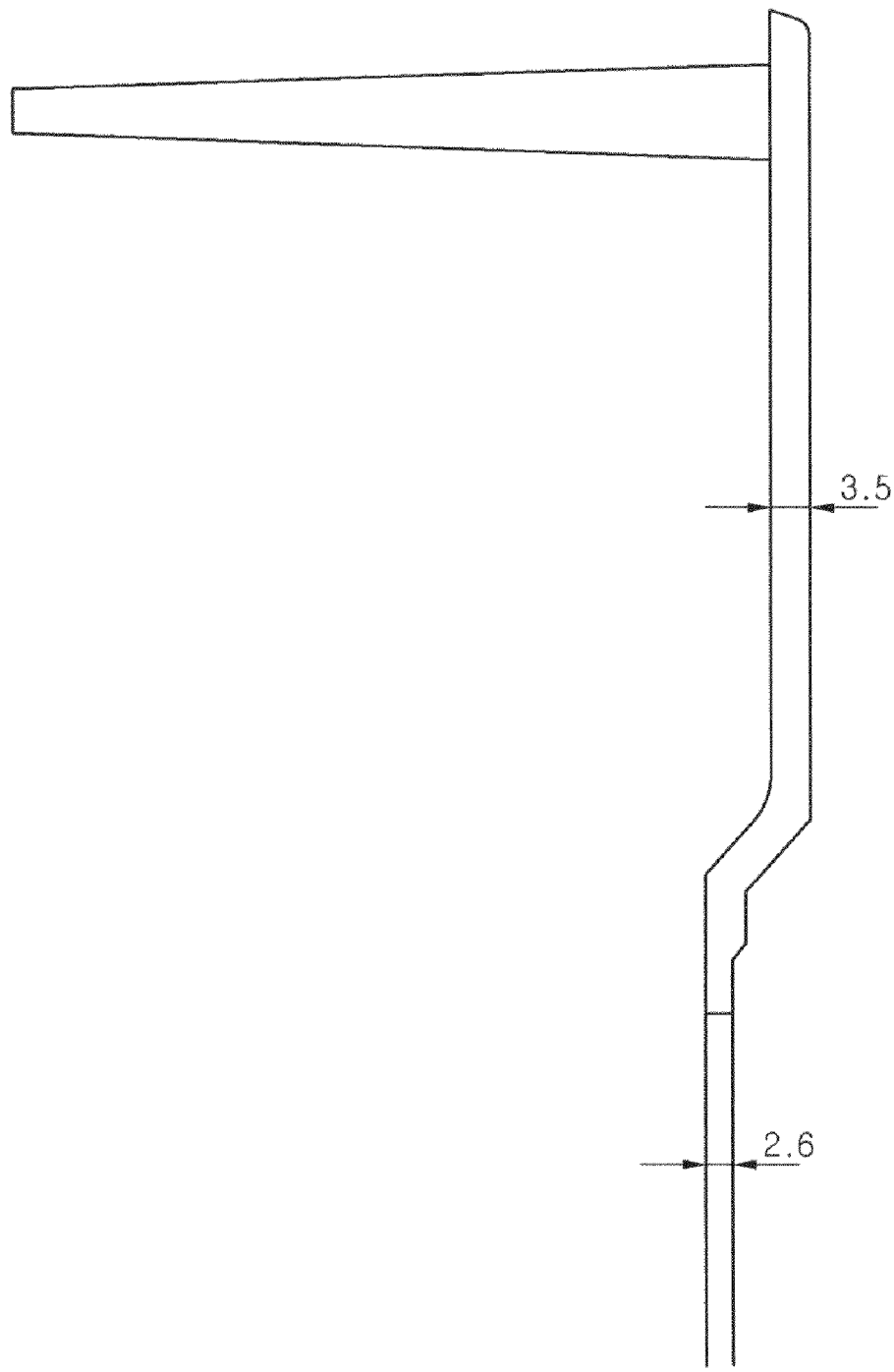
FIG. 10B is a detailed view showing a relationship between dimensions of a gate portion of a light guided plate according to an embodiment of the present application.
Figure 11A:
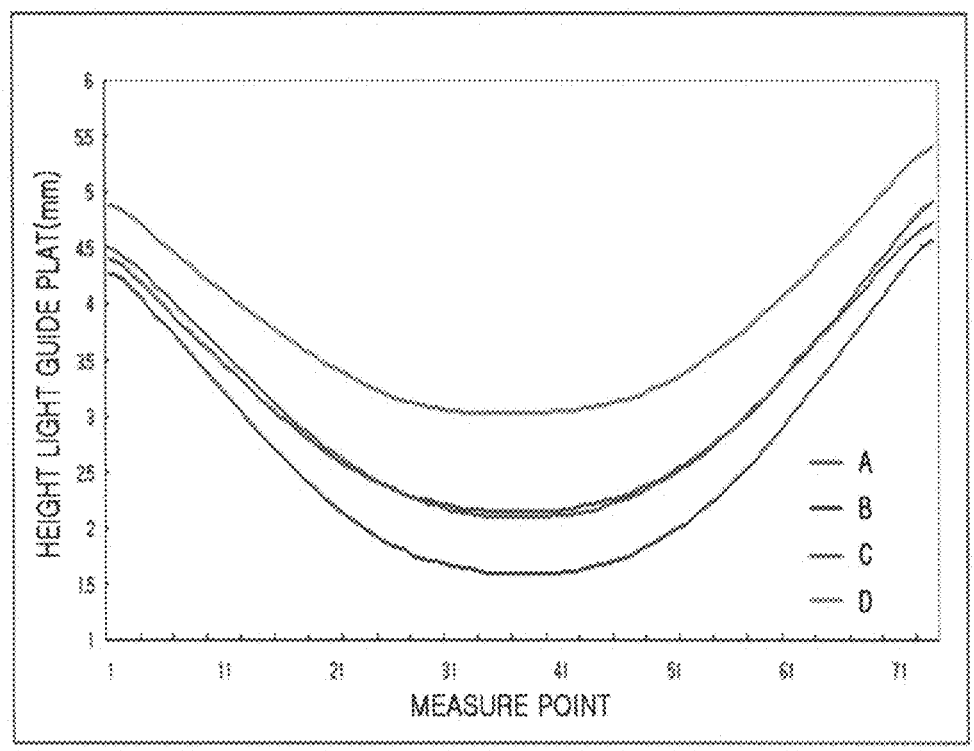
FIGS. 11A and 11B are graphs illustrating bending characteristics of the light guide plate fabricated with the injection mold according to the related art compared with an embodiment of the present invention.
Figure 11B:
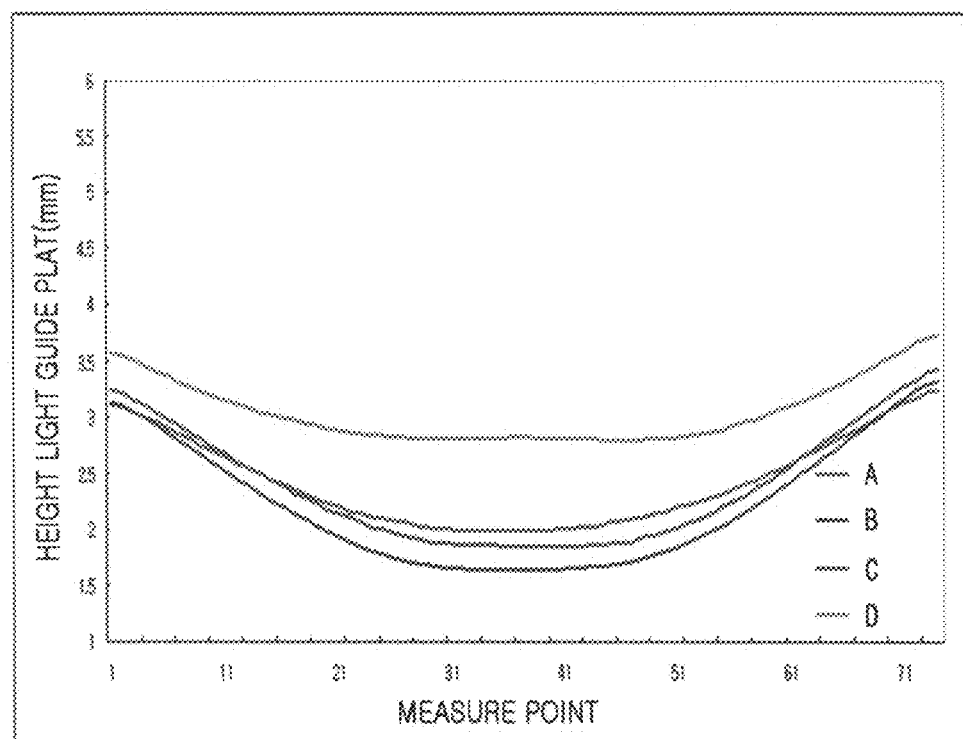

Next, FIG. 10A is a perspective view of the light guide plate for illustrating a bending characteristic measuring standard of the light guide plate according to an embodiment of the present invention, and FIGS. 11A and 11B are graphs explaining the bending characteristic of the light guide plate fabricated with the injection mold according to the related art and an embodiment of the present invention. As shown in FIG. 11A, the width of the lower portion of the gate fabricated with the injection mold of the related art is only 10% or so of the maximum width of the light guide plate.

Further, in the experiment performed for obtaining the measurement graphs of FIGS. 11A and 11B, the width of the light guide plate was 350 mm, the width of the lower portion of the gate 231 of the present embodiment was 260 mm, and the width of the lower portion of the gate of the related art was 70 mm. Also, the thickness of the upper portion of the gate 231 of the present embodiment was 3.5 mm, and the thickness of the upper portion of the gate of the related art was 5.5 mm. The specific numerical values of the light guide plate and the gate are an example of a preferable embodiment of the present invention, but are not limited thereto, and the embodiment might have various combinations of numbers in accordance with the size, the material and the process condition of the light guide plate. FIG. 10B illustrates the width of the lower portion of the gate being 2.6 (or 260 mm) and the width of the light guide plate being 3.5 (or 350 mm) according to an embodiment of the present invention.

As shown in FIG. 10A, measure points from 1 to 74 (1, 11, 21, 31, 41, 51, 61, 71 are only marked) were set in the longitudinal direction of the fourth surface 230d being the thinnest side of the light guide plate 230. After setting the different distance from the corner of the fourth surface 230d to the corner of the third surface 230c by dividing the area with lines A, B, C and D, the height (mm) of the lines was measured at each measurement point.

Referring to FIG. 11A, the difference between the maximum height at both end portions of the light guide plate of the related art and the minimum height at the central portion of the light guide plate is around 3.69±0.23 mm. As shown in FIG. 11B, the difference between the maximum and minimum heights of the light guide plate according to the embodiment of the present invention is around 2.33±0.05 mm, which shows that the bending characteristics is improved when compared with the related art light guide plate.

Figure 13A:
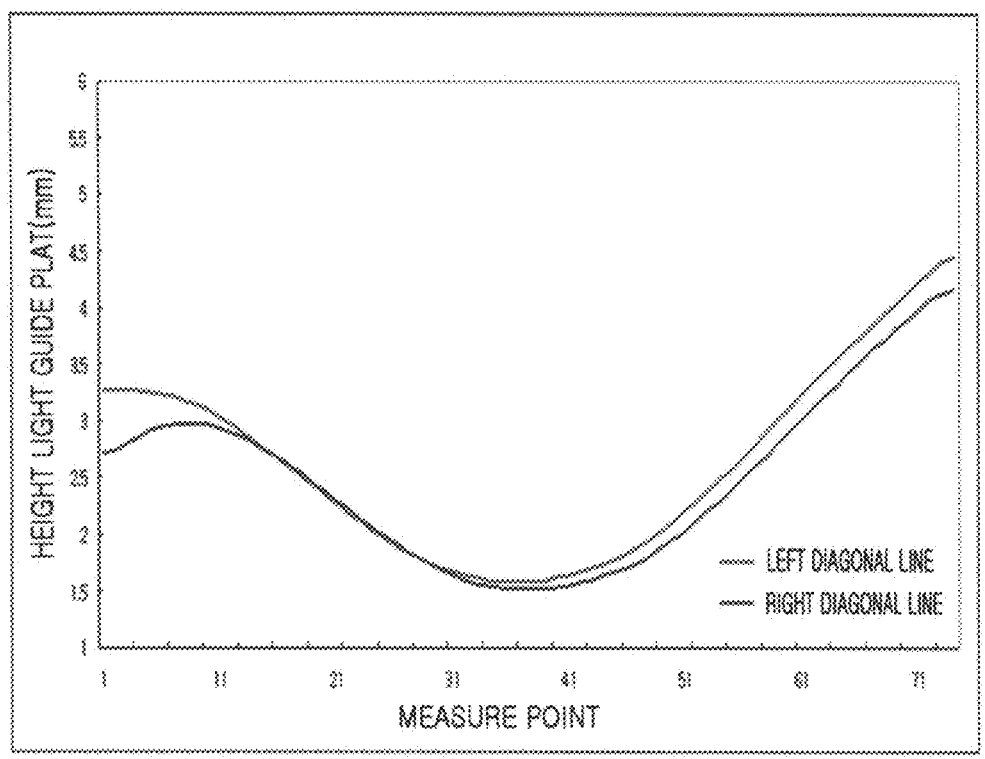
FIGS. 13A and 13B are graphs illustrating twist characteristics of the light guide plate fabricated with the injection mold according to the related art and an embodiment of the present invention.
Figure 13B:
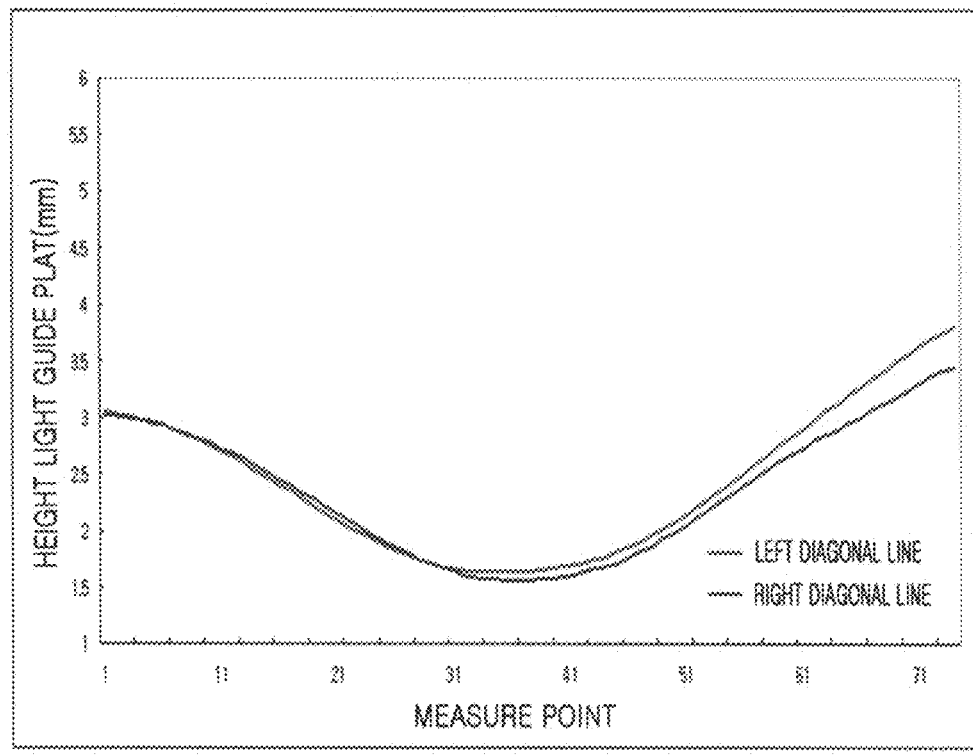

Next, FIG. 12 is a perspective view of the light guide plate illustrating a twist characteristic measuring standard of the light guide plate according to an embodiment of the present invention, and FIGS. 13A and 13B are graphs used for explaining the twist characteristic of the light guide plate fabricated with the injection mold according to the related art and the present embodiment.

In the experiment performed for obtaining the measurement graph of FIGS. 13A and 13B, the width of the light guide plate is 350 mm, the width of the lower portion of the gate 231 of the present embodiment is 260 mm, and the width of the lower portion of the gate of the related art is 70 mm. Again, FIG. 10B illustrates these dimensions for the embodiment of the present invention. Also, the thickness of the upper portion of the gate 231 according to the embodiment of the present invention is 3.5 mm, and the thickness of the upper portion of the gate of the related art is 5.5 mm. The specific numerical values of the light guide plate and the gate can be a preferable embodiment of the present invention, but are not limited thereto, and the embodiment of the present invention can have various combinations of numbers in accordance with the size, the material and the process condition of the light guide plate.

Referring to FIG. 12, measure points from 1 to 74 (1, 11, 21, 31, 41, 51, 61, 71 are only marked) are set along the corner of the first surface 230a from the fourth surface 230d being the thinnest side of the light guide plate 230 to the third surface 230c. Also, the heights (mm) at points, which correspond to each measure point, on left and right diagonal lines of the first surface 230a were measured.

Referring to FIG. 13A, the difference of height at the measure points 1-15 of the light guide plate of the related art is around 0.5 mm when observing the graphs of the left and right diagonal lines. On the contrary, as shown in FIG. 13B, almost no difference is observed in the height of the light guide plate in the graphs of the left and right diagonal lines. Accordingly, the degree of twist of the light guide plate according to the embodiment is advantageously improved when compared to the related art light guide plate.

Therefore, according to an embodiment of the present invention, the shape of the gate portion for transferring the resin from the injector (i.e., nozzle 251) to the light guide plate forming portion is modified. Accordingly, the uniformity of the molded optical pattern is improved and the bending of the light guide plate is reduced by minimizing the residual stress of the light guide plate.

Figure 14:
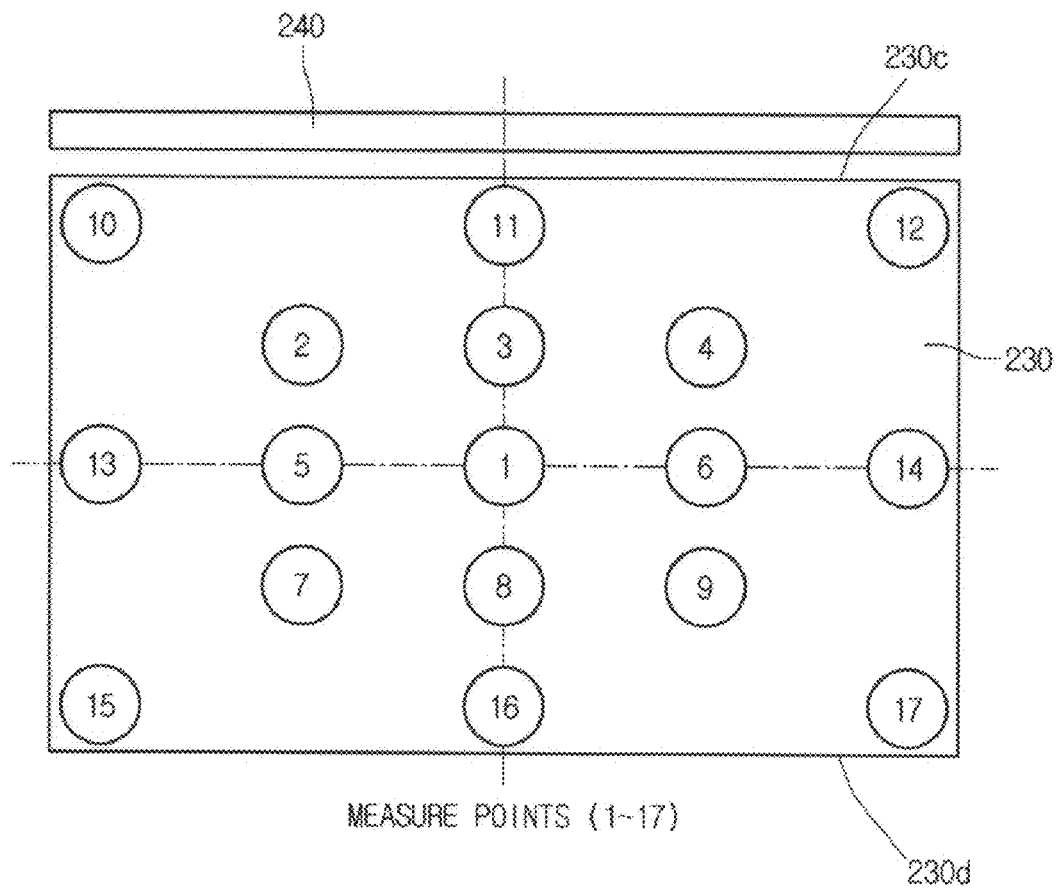
FIG. 14 is an overview of the light guide plate that show a measuring standard for the brightness characteristics of the light guide plate according to an embodiment of the present invention.
Figure 15:
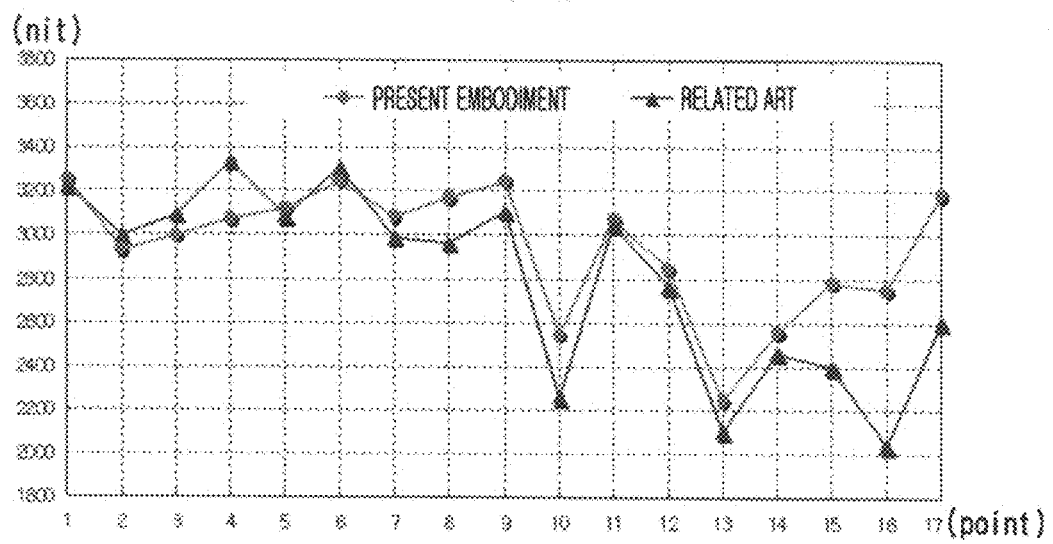
FIG. 15 is a graph illustrating brightness characteristics of the light guide plate fabricated with the injection mold according to an embodiment of the present invention.

Next, FIG. 14 is an overview of the light guide plate for illustrating a measuring standard for the brightness characteristic of the light guide plate according to an embodiment of the present embodiment, and FIG. 15 is a graph illustrating the brightness characteristic of the light guide plate fabricated with the injection mold according to the present embodiment.

Referring to FIG. 14, a lamp 240 is disposed at one side (i.e., at one side of the third surface 230c being the thickest) of the light guide plate 230 fabricated by the injection molding method according to the present embodiment. The light emitted from the lamp 240 is incident from the third surface 230c and is dispersed and reflected within the light guide plate 230 to progress to the first surface 230a. Measure points from 1 to 17 are also set in the first surface 230a through which the light passes so as to measure the brightness (unit is nit) of each point.

Referring to FIG. 15, the light guide plate fabricated with the mold having the gate portion of the related art shows that the brightness is not uniform within the surface of the light guide plate, and especially that the brightness is remarkably decreased at the vicinity of the end portion, i.e., the fourth surface, of the light guide plate fabricated with the mold having the related art gate portion.

This is because the quality of injection-molding is deteriorated since the resin is not sufficiently filled at a remote portion (e.g., around the fourth surface) to the gate as the resin is filled into the broad cavities from the narrow gate at a high pressure when injection-molding the light guide plate with a mold having the narrow gate portion structure of the related art.

On the contrary, the light guide plate 230 fabricated with the mold having the gate portion 255 according to embodiments of the present invention has the uniform brightness within the surface of the light guide plate 230. This is because the gate structure according to the present embodiment has a broad entrance portion through which the resin is injected into the forming portion 257. Because the resin can be filled into the cavities with a low temperature, the forming property of the optical pattern of the remote portion (e.g., around 15, 16, 17 points) to the gate portion 255 is improved and the uniformity of the brightness is improved as indicated by the graph in FIG. 15.

In this way, in the process of fabricating the light guide plate using the injection mold which includes the structurally modified gate according to the present embodiment, the resin is made to flow smoothly and is smoothly filled in the light guide plate forming portion at a low pressure. Therefore, it is possible to improve the precision of the optical pattern molding of the light guide plate and to improve the brightness uniformity of the light guide plate.

Further, the generation of the bending or the reverse bending of the light guide plate within the display device having the light guide plate according to embodiments of the present invention can be minimized, thereby preventing the picture quality defect of the display panel. Also, the injection mold according to the present embodiment decreases the residual stress and the bending and/or twisting of the light guide plate, thereby improving the quality and the production yield of the light guide plate. Furthermore, the LCD device according to embodiments of the present invention minimizes the bending or the reverse bending of the light guide plate, thereby preventing the picture quality defect of the LCD panel.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An injection mold for forming a light guide plate, comprising:
   a first block;
   a second block configured to face the first block;
   a forming portion included between the first and second blocks facing each other and having a shape of the light guide plate;
   an injection portion formed at the first block and configured to receive injected resin for forming the light guide plate; and
   a gate portion configured to guide the injected resin from the injection portion to the forming portion,
   wherein a width of a first end portion of the gate portion that is connected to the forming portion is 50%-80% of a width of the forming portion,
   wherein a second end of the gate portion that is connected to the injection portion is thicker than the forming portion, and
   wherein the second end of the gate portion is thicker than the first end of the gate portion.

2. The injection mold of claim 1, wherein the thickness of the second end of the gate portion that is connected to the injection portion is 1.3-1.5 times a maximum thickness of the forming portion.

3. The injection mold of claim 2, wherein the thickness of the second end of the gate portion that is connected to the injection portion is 15-25 mm.

4. The injection mold of claim 1, wherein the gate portion includes at least one step difference such that the gate portion has a stepped-shape.

5. The injection mold of claim 1, wherein at least one surface of the forming portion includes a plurality of patterns.

6. The injection mold of claim 1, further comprising:
cooling channels formed in at least one of the first and second blocks and configured to cool the injected resin.

7. The injection mold of claim 1, wherein the injected resin comprises thermoplastic resin.

8. The injection mold of claim 1, wherein the first and second blocks are configured to be detachably connected to each other such that the first and second blocks can be separated from one another and the molded light guide panel can be removed from the first and second blocks.

9. The injection mold of claim 8, wherein the molded light guide panel is disposed in a backlight unit of a liquid crystal display.

* * * * *